United States Patent [19]

Martinez

[11] Patent Number: 4,526,213

[45] Date of Patent: Jul. 2, 1985

[54] WEIGHING DIVIDING MACHINES

[76] Inventor: Federico Martinez, 6, Alfonso XIII, St., Parets del Valles (Barcelona), Spain

[21] Appl. No.: 509,425

[22] Filed: Jun. 30, 1983

[30] Foreign Application Priority Data

Jul. 10, 1982 [DE] Fed. Rep. of Germany ....... 3225892

[51] Int. Cl.$^3$ .............................................. B65B 1/10
[52] U.S. Cl. ...................................... 141/18; 141/98; 141/284; 141/331; 222/77; 222/168
[58] Field of Search .......................... 141/83, 129–192, 141/1–12, 18, 250–284, 98, 331–345; 222/160–172, 77

[56] References Cited

U.S. PATENT DOCUMENTS 3,521,426  7/1970  Evins ...................................... 141/83

Primary Examiner—Houston S. Bell, Jr.
Attorney, Agent, or Firm—James & Franklin

[57] ABSTRACT

Apparatus for dividing freeflowing particulate matter into aliquots of closely equal weight comprises a weighing receiver and a volumetric dividing receiver. The weighing receiver receives freeflowing particulate matter and includes a weigher for determining when a predetermined weight of the matter has been received therein and a discharger for then discharging the predetermined weight of received matter. The volumetric dividing receiver receives the matter discharged from the weighing receiver and includes a plurality of aliquot receivers of identical effective volumetric capacity, a distributor for distributing on a volumetric basis the matter received by the dividing receiver into the aliquot receivers, and structure for discharging the matter from the aliquot receivers.

13 Claims, 3 Drawing Figures

WEIGHING DIVIDING MACHINES

BACKGROUND OF THE INVENTION

The present invention relates to weighing dividing machines of the type specially designed for use in dispensing powdered or granulated materials, ensuring that the weight dispensed is correct and allowing use in a continuous process.

The weighing dividing machine is useful both when it is desired to weigh out large quantities, as is the case when bags are to be filled, and also when small bottles are to be filled (of the type used in chemist's shops, for example), a technology with the general dimensions of the equipment varying solely for that purpose.

The increasing scope of hygienic controls over foodstuffs, together with the present day trend toward packaging all types of powdered or granulated products, has resulted in the development of an important packaging technology in recent years, designed to put a determined quantity of product into the appropriate container by processes which are as automated as possible.

This has made it necessary to include in the packaging line an apparatus whose function is to ensure that the quantity put into each container is the correct amount planned for the latter.

At the same time, the significant expansion of the consumers' associations, which are increasingly monitoring the quality and quantity of products, has made it necessary to refine control of the quantities weighed out, in order to attempt to minimize variations in the amounts put into the containers and in any case to keep them within the established standards.

To date, two different types of apparatus have been used to graduate the amount to be put into the container.

The older types are volumetric dispensers, which divide the product as it reaches them into quantities of equal volume. In many cases, however, the varying density of the product over time, temperature changes, etc. prevents the weights from also being equal.

A more recent technological advance is represented by the weighing dispensers, in which control is by weight. These require the presence of a scale or loading cell which accepts the correct quantity of product up to the desired weight, and then delivers the product to a hopper which finally puts it into the container.

The need to maximize the accuracy of the weight put into each container has been causing the volumetric dispensers to fall into disrepute in recent years because of the differences of measure by weight in which their use results, and has been making it necessary to effect the control by means of weighing dispensers. These avoid the above problem, but as a negative consequence result in greater slowness of the production process, which in turn make the process considerably more costly.

Accordingly, it is an object of the present invention to provide a weighing dispenser combining in itself elements coming from the two existing types of dispenser, in other words, from both the volumetric dispenser and the weighing dispenser. It is another object to provide such a device which ensures an accuracy of weight even greater than that obtained with the conventional weiging dispensers, while at the same time providing production rates much higher than those of the latter and close to or even higher than those of the volumetric dispensers.

SUMMARY OF THE INVENTION

The basic mechanical principle of the present invention consist of first an exact weighing with a weighing dispenser similar to those of conventional type, and then in a continuous process putting the weighed product into a series of identical receptacles. Each of these receptacles is thus known with certainty to contain the same amount as every other, and the apparatus is appropriately designed to make sure that it allows continuous delivery of the amount of product necessary to fill each container.

While the weighing dispenser area is effecting a weighing, the apparatus is able to perform a number of fillings equal to the number of receptacles positioned underneath the weigher, since the unit is mounted on a rotating frame which allows the process to take place continuously without stops. This in turn will allow the machine to be used on a continuous packaging line.

The accuracy which can be achieved with this machine is even greater than with conventional weighing dispensers, inasmuch as the tolerance achieved will be as many times closer than that of a conventional dispenser as there are separate receptacles among which to divide an error in the weighed quantity of product in the main dispenser.

BRIEF DESCRIPTION OF THE DRAWINGS

To facilitate explanation, the present specification is accompanied by a sheet of drawings, in which are shown, by way of illustrative but not restrictive example, a completed weighing dividing machine which includes the improvements claimed.

DETAILED DESCRIPTION OF THE PREFERRED EMBODIMENTS

Figure 1:
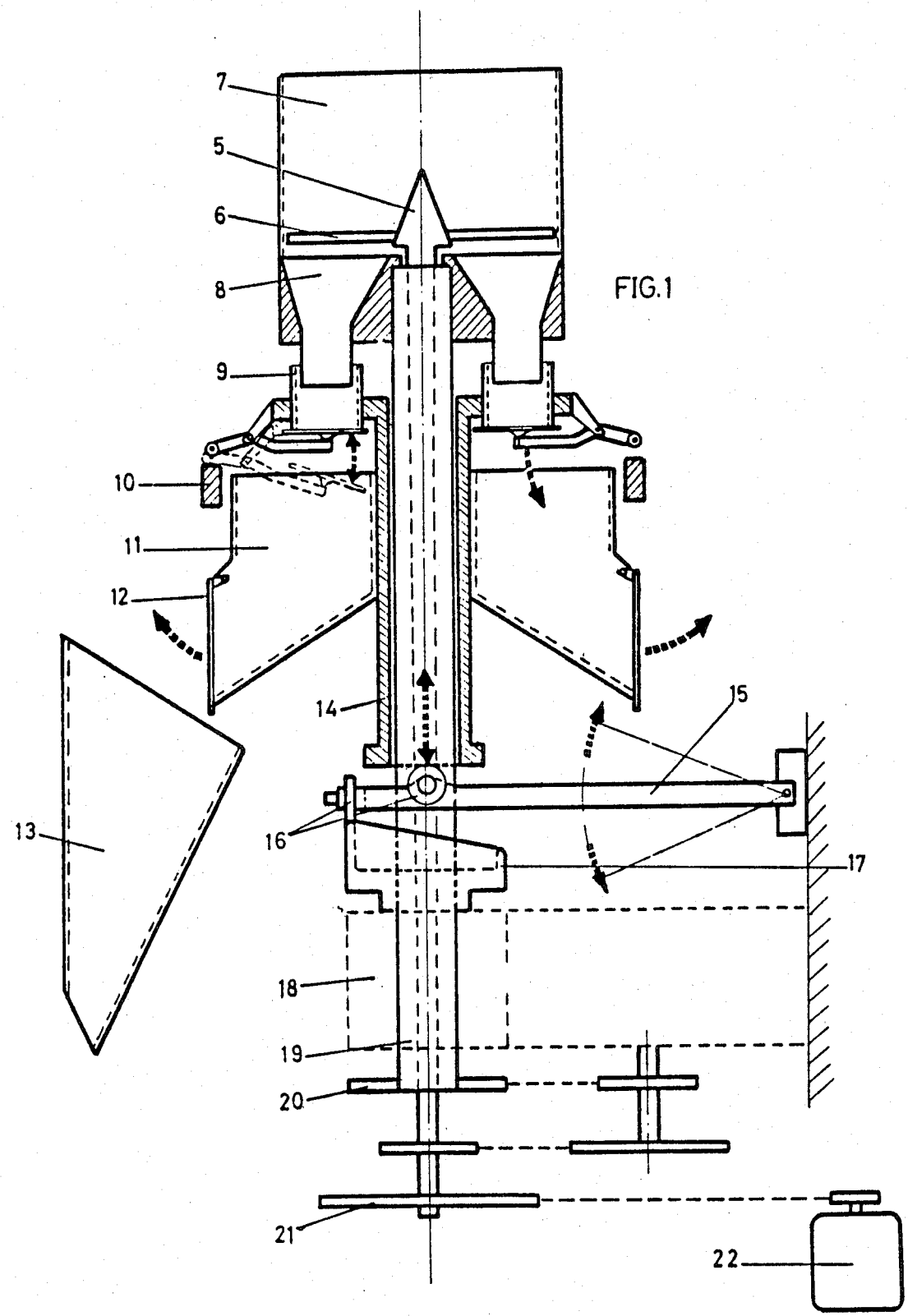
FIG. 1 is a part-sectional elevation of a weighing dividing machine as claimed.
Figure 2:
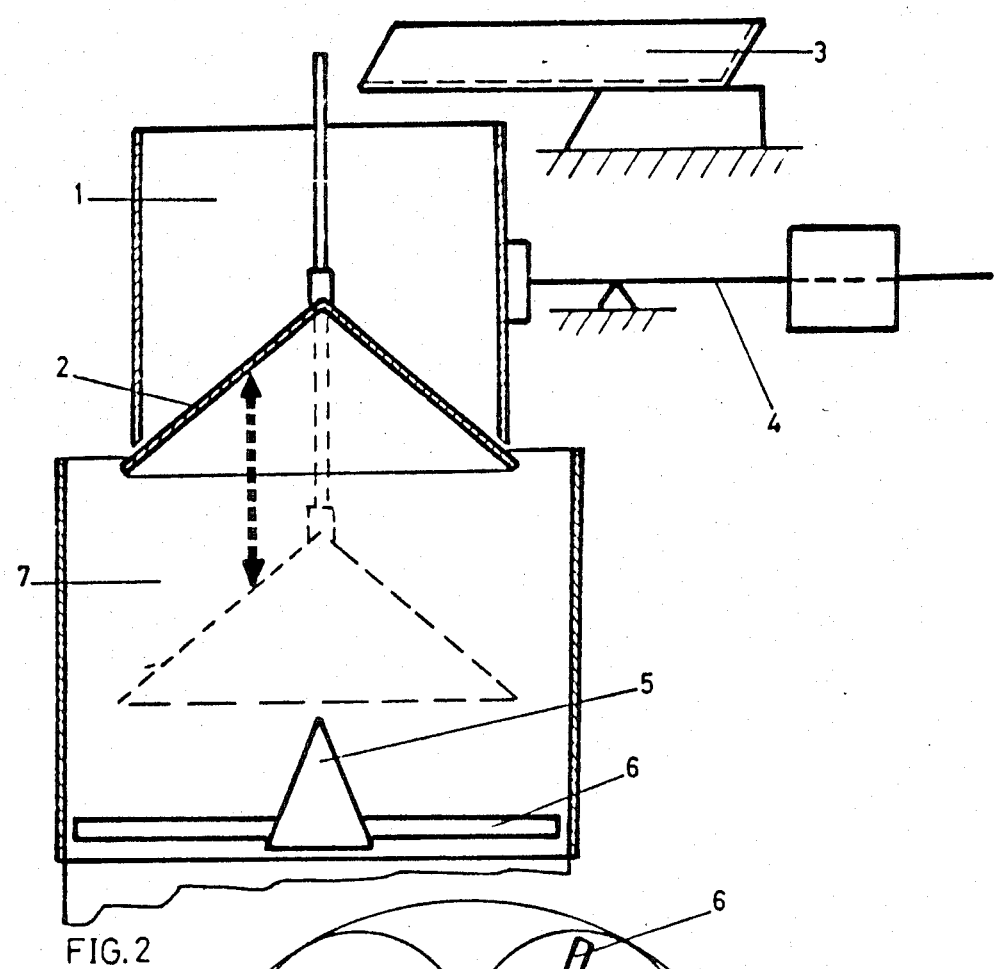
FIG. 2 is a fragmentary elevation of the weighing dispenser shown in FIG. 1.
Figure 3:
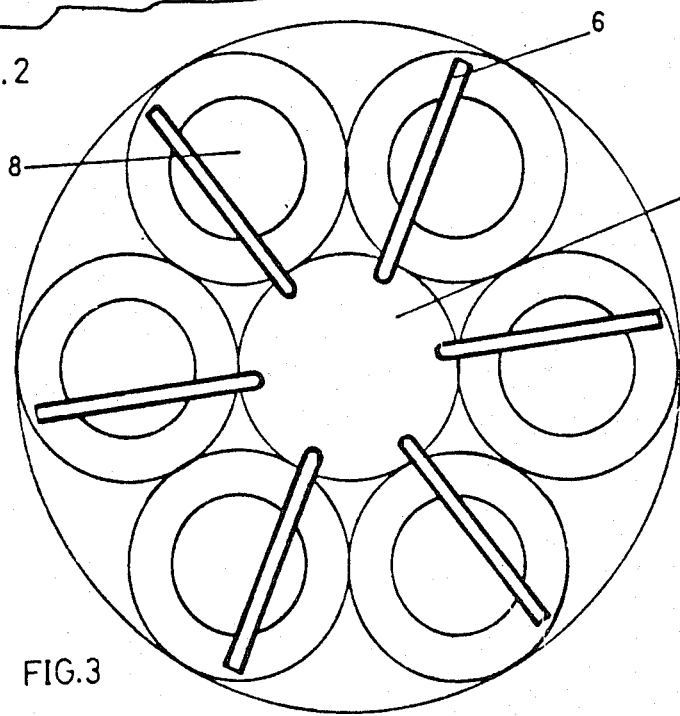
FIG. 3 is a plan view of the machine of FIG. 2.

As can be seen in the drawings, the weighing dividing machine comprises a hopper -1- which is integral with the weight detector element. The bottom -2- of the hopper tapers inwards. The hopper is connected to the weight detector element which controls the feeder -3- until the required weight is reached. At this point, weighing takes place. The weight is appropriately monitored by a scale -4-.

Underneath and surrounding the round receiver -1- of the weigher is the receiver -7- of the divider properly speaking. In the receiver is a central shaft -5- which rotates at the appropriate speed and is driven by a motor and reduction gear -22- and -21- through a ring gear mounted on the shaft. This shaft runs through a hollow shaft -19- which rotates at a slower speed and is driven by another ring gear -20-, which is associated with the first one through a reduction gear so as to ensure the necessary relative motion between the two gears.

Mounted on the inner shaft -5- are a number of rods -6-, which are arranged horizontally and rotate continuously inside the receiver -7- over the tops of the cups -8- of the receiver. The cups are completely identical to one another. Under these cups are movable cups -9- with lids. The latter cups rise or descend due to the intermittent vertical motion imparted to a movable tube -14- which surrounds the shaft -19- by a circular eccentric -17- mounted on the main shaft -19-. Eccentric travel rollers -16- are mounted on the lever -15-. The assembly rests on the stationary support -18-.

Both the movable cups -9- with lids and the intermediate receivers -11- installed directly underneath them are integral with the movable tube -14- and rotate with it. The intermediate receivers -11- are also fitted with lids -12-, which swing open at the appropriate moment and allow the product they contain to fall into the product delivery funnel -13-.

The opening action of the bottom lid of the cups -9- occurs when the end of the lever that supports them strikes the stationary ring -10- and causes this step to take place.

The above description of the Figures, using the numerals to which reference has been made, will facilitate explanation of the method of operation of the weighing dividing machine which is claimed.

In the first step, the round receiver -1- of the weigher is filled with product coming from the feeder -3-, until the scale -4- detects that the correct quantity by weight has been put in.

At this point, the tapered bottom -2- descends vertically and the content of product falls into the receiver -7- and tends to enter the cups -8-. Precise performance of this step is ensured by the fact that this set of cups rotates constantly, driven by the motor -22- and reduction gear, while at the same time the inner shaft -5- on which are mounted the horizontal rods -6- turns much faster, driven through the aforesaid reduction gear, and causes all of the product to be put uniformly into the cups -8-.

While this action is taking place, the lower cups -9- are in their topmost position, due to the fact that the rollers -16- are resting at the highest point of the eccentric -17-.

From this point, as the shaft -19- continues to turn, the eccentric turns with it, the rollers descends and with it the tube -14-, which as it moves down takes with it both the cups -9- and the intermediate receivers -11-.

When the end of the lever which holds the bottom lids of the cups -9- strikes the circular ring -10-, it causes these lids to open, allowing the product inside to fall into the intermediate receivers -11-, which when they are positioned to coincide with the discharge receiver -13- allow the product to fall into it, thus making it possible to fill the containers.

The result is that an alternating motion, such as is the weighing which takes place in the first receiver of the weigher, is converted into a continuous motion of filling of containers at a much higher speed, which makes possible problem-free maintenance of the rate of action of a continuous line for packaging powdered products, while at the same time it is ensured that the quantity of product contained in each container is correct and perfectly controlled within very close tolerances.

I claim:

1. Apparatus for dividing freeflowing particulate matter into aliquots of closely equal weight comprising:
   (A) a weighing receiver for receiving freeflowing particulate matter, said weighing receiver including means for determining when a predetermined weight of the matter has been received therein and means for then discharging the predetermined weight of said received matter; and
   (B) a volumetric dividing receiver for receiving the matter discharged from said weighing receiver, said dividing receiver including a plurality of aliquot receivers of identical effective volumetric capacity, means for distributing on a volumetric basis the matter received by said dividing receiver into said aliquot receivers, and means for discharging the latter from said aliquot receivers.

2. The apparatus of claim 1 wherein said aliquot receivers are disposed at the bottom of said dividing receiver, and said distributing means comprises means for rotating said dividing receiver relative to said weighing receiver, leveling means disposed adjacent and over the top of each of said aliquot receivers and means for causing said leveling means to level the matter in each of said aliquot receivers.

3. The apparatus of claim 1 including means for varying said effective volumetric capacity of said aliquot receivers identically for each of said aliquot receivers simultaneously, said effective volumetric capacity being at or near a minimum during receipt of the matter from said weighing receiver and thereafter gradually increasing until the discharge of the matter from said aliquot receivers.

4. The apparatus of claim 2 including means for varying said effective volumetric capacity of said aliquot receivers identically for each of said aliquot receivers simultaneously, said effective volumetric capacity being at or near a minimum during receipt of the matter from said weighing receiver and thereafter gradually increasing until the discharge of the matter from said aliquot receivers.

5. The apparatus of claim 1 additionally including a first rotatable shaft and means for rotating said first rotatable shaft, portions of said dividing receiver being mounted on said first rotatable shaft for rotation therewith.

6. The apparatus of claim 2 additionally including a first rotatable shaft and means for rotating said first rotatable shaft, said dividing receiver being mounted on said first rotatable shaft for rotation therewith, and wherein said leveling means comprises a second rotatable shaft and a plurality of horizontal rods carried by said second shaft.

7. The apparatus of claim 6 additionally including means to rotate said second shaft relative to said first shaft.

8. The apparatus of claim 6 wherein said first shaft is hollow and said second shaft is concentrically disposed within said first shaft.

9. The apparatus of claim 6 wherein said aliquot receivers are cup-like members having vertically displaceable bottoms, and said apparatus additionally includes a vertically reciprocatable rotatable tube disposed about said first shaft for rotation therewith, said tube supporting said bottoms for rotation therewith.

10. The apparatus of claim 9 wherein said means for vertically reciprocating said tube comprises a roller riding a circular eccentric mounted on said first shaft for rotation therewith and a roller riding said eccentric and supporting said tube.

11. The apparatus of claim 9 wherein said tube maintains said bottoms in a bottom-closing vertically elevated position with respect to said cup-like members when said tube is at its highest and in a vertically lowered position thereafter, as said tube descends, whereby the effective volumetric capacity of said aliquot receivers is least when said tube maintains said bottoms in a vertically elevated position and increases thereafter.

12. The apparatus of claim 9 wherein said means for discharging the matter from said aliquot receiver comprises means for upsetting said bottoms of said aliquot receivers as said bottoms pass a predetermined horizontal plane.

13. The apparatus of claim 12 wherein said upsetting means comprises a stationary horizontal ring disposed so as to engage and upset said bottoms.

* * * * *